(12) United States Patent
Gillespey et al.

(10) Patent No.: US 10,137,799 B2
(45) Date of Patent: Nov. 27, 2018

(54) SYSTEM AND METHOD FOR CONTROLLING MULTIPLE ELECTRIC DRIVES

(71) Applicant: FORD GLOBAL TECHNOLOGIES, LLC, Dearborn, MI (US)

(72) Inventors: Brian Gillespey, Gregory, MI (US); Arnulf Sponheimer, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 14/973,982

(22) Filed: Dec. 18, 2015

(65) Prior Publication Data
US 2017/0174097 A1   Jun. 22, 2017

(51) Int. Cl.
*B60L 15/20* (2006.01)
*B60L 3/12* (2006.01)

(52) U.S. Cl.
CPC ............ *B60L 15/2045* (2013.01); *B60L 3/12* (2013.01); *B60L 2240/423* (2013.01); *B60L 2240/547* (2013.01); *B60L 2260/28* (2013.01); *B60L 2260/44* (2013.01); *Y02T 10/7258* (2013.01)

(58) Field of Classification Search
CPC ............................. B60L 15/2045; B60L 3/12
See application file for complete search history.

(56) References Cited

U.S. PATENT DOCUMENTS

| | | | |
|---|---|---|---|
| 5,939,848 A | 8/1999 | Yano et al. | |
| 7,330,785 B2 | 2/2008 | Odenthal et al. | |
| 8,892,288 B2 | 11/2014 | Derflinger et al. | |
| 2014/0081500 A1* | 3/2014 | Ito | B60W 20/13 701/22 |
| 2014/0343774 A1 | 11/2014 | Wimmer et al. | |
| 2015/0051766 A1 | 2/2015 | Matsui et al. | |

* cited by examiner

*Primary Examiner* — Basil T. Jos
(74) *Attorney, Agent, or Firm* — David Kelley; Brooks Kushman P.C.

(57) ABSTRACT

An electric vehicle includes a plurality of electric drive units coupled to one or more axles of the electric vehicle. The drive units have an associated power loss map that is approximated by a plurality of second-order polynomials. Torque is apportioned between the electric drive units to minimize total power losses based on coefficients of the second-order polynomials for each of the electric drive units and a driver torque demand.

18 Claims, 3 Drawing Sheets

SYSTEM AND METHOD FOR CONTROLLING MULTIPLE ELECTRIC DRIVES

TECHNICAL FIELD

This application generally relates to a system for controlling torque distribution in an electric vehicle having multiple electric drive units.

BACKGROUND

Electric vehicles typically include a single electric machine that provides propulsion. With a single electric drive unit the electric machine torque must follow a driver torque request. Losses and efficiency are determined by the properties of the single electric machine at an operating point defined by the driver torque request. As such, any optimization of losses or efficiency must be done at design time before the electric vehicle is placed into operation.

SUMMARY

In some configurations, an electric-drive vehicle includes first and second propulsive drive units each exhibiting power loss change with respect to torque changes over a plurality of operating conditions. The electric-drive vehicle also includes a controller programmed to increase a proportion of propulsive torque provided by the first drive unit in response to a change in the operating conditions resulting in a rate of power loss change of the second drive unit increasing relative to that of the first drive unit.

Some configurations may include one or more of the following features. The electric-drive vehicle in which the controller is further programmed to decrease a proportion of propulsive torque provided by the first drive unit in response to the change in operating conditions resulting in the rate of power loss change of the second drive unit decreasing relative to that of the first drive unit. The electric-drive vehicle in which the first drive unit is coupled to a front axle of the electric vehicle and the second drive unit is coupled to a rear axle of the electric vehicle. The electric-drive vehicle in which the controller is further programmed to derive the rate of power loss change from a second-order coefficient of a second-order polynomial that characterizes power loss at a present operating condition. The electric-drive vehicle in which the operating conditions include a voltage input to the first and second drive units and a speed associated with the first and second drive units. The electric-drive vehicle in which the controller is further programmed to derive the rate of power loss change from a power loss map that is characterized by a plurality of second-order polynomials each describing drive unit power loss at a predetermined drive unit speed and a predetermined drive unit input voltage. The electric-drive vehicle in which each of the second-order polynomials describes drive unit power loss for a range of drive unit torque values. The electric-drive vehicle in which the controller is further programmed to change the proportion of propulsive torque provided by the first drive unit in response to a change in operating conditions resulting in a first-order power loss coefficient of the second drive unit changing relative to a first-order power loss coefficient of the first drive unit.

A system of one or more computers may be configured to perform particular operations or actions by virtue of having software, firmware, hardware, or a combination thereof installed on the system that, in operation, causes the system to perform the actions. One or more computer programs may be configured to perform particular operations or actions by virtue of including instructions that, when executed by data processing apparatus, cause the apparatus to perform the actions. In some configurations, a method for apportioning torque between drive units in an electric-drive vehicle includes increasing, by a controller, a proportion of propulsive torque provided by a first drive unit in response to a change in operating conditions resulting in a rate of power loss change of a second drive unit increasing relative to that of the first drive unit. Other configurations may include corresponding computer systems, apparatus, and computer programs recorded on one or more computer storage devices, each configured to perform the actions of the methods.

Some configurations may include one or more of the following features. The method may include decreasing, by the controller, a proportion of driver demand torque provided by the first drive unit in response to a change in operating conditions resulting in a rate of power loss change of the second drive unit decreasing relative to that of the first drive unit. The method may include deriving, by the controller, the rate of power loss change from second-order coefficients of second-order polynomials that characterize power loss maps at a present operating condition for each of the drive units. The method may include changing, by the controller, the proportion of propulsive torque provided by the first drive unit according to a ratio of the second-order coefficient of the second drive unit to a sum of second-order coefficients of the first drive unit and the second drive unit. The method may include increasing, by the controller, an amount of torque provided by a first drive unit in response to an increase in a first-order coefficient of the second drive unit relative to the first drive unit. The method may include increasing, by the controller, the amount of torque provided by the first drive unit according to a ratio of a difference between the first-order coefficients of the first and second drive units to a sum of the second-order coefficients of the first and second drive units. The method in which the change in operating conditions includes an input voltage change and a drive unit speed change. Implementation of the described configurations may include hardware, a method or process, or computer software on a computer-accessible medium.

In some configurations, an electric-drive vehicle propulsion system includes a controller programmed to increase a proportion of torque provided by a first electric machine relative to a second electric machine, each exhibiting power loss change with respect to torque changes over a plurality of operating conditions, in response to operating condition changes that result in an increase in a rate of power loss change of the second electric machine relative to that of the first electric machine.

Some configurations may include one or more of the following features. The electric-drive vehicle propulsion system in which the controller is further programmed to derive the rate of power loss change from a second-order coefficient of a second-order polynomial that characterizes a power loss map at a present operating condition. The electric-drive vehicle propulsion system in which the controller is further programmed to decrease a proportion of torque provided by the first electric machine in response to a decrease in the rate of power loss change of the second electric machine relative to the first electric machine. The electric-drive vehicle propulsion system in which the first electric machine and the second electric machine are coupled to a front axle of the electric-drive vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
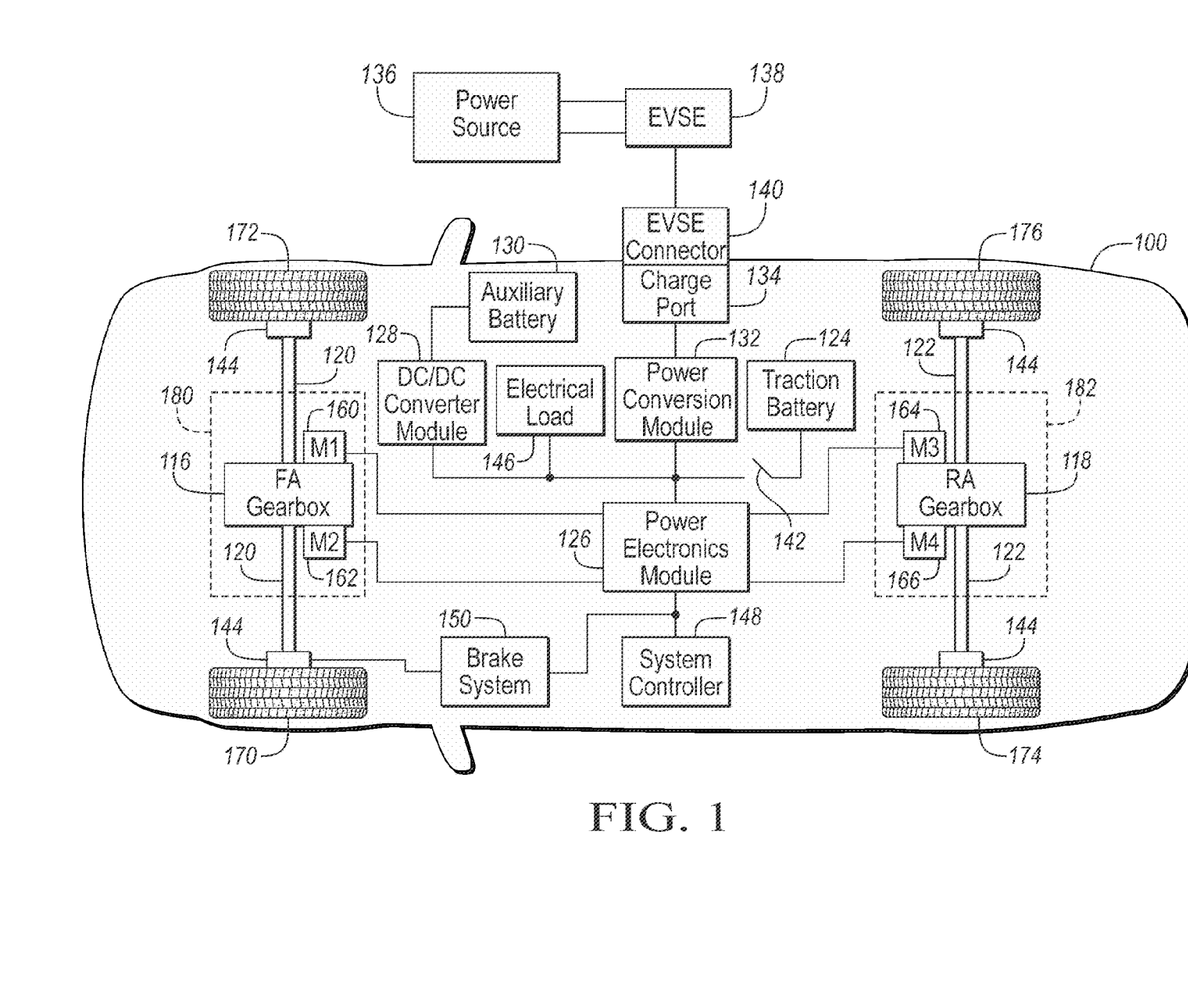
FIG. 1 is a diagram of an electric-drive vehicle illustrating typical drivetrain and energy storage components.

FIG. 1 depicts a possible configuration for a battery-electric vehicle (BEV). A battery-electric vehicle 100 may comprise one or more electric machines mechanically coupled to one or more gearboxes to achieve a variety of driving configurations. One or more electric machines coupled to a gearbox may be referred to as a drive unit. A first drive unit 180 may include a first front-axle electric machine 160 and a second front-axle electric machine 162 coupled to a front-axle gearbox 116. The front-axle gearbox 116 may include one or more gears that combine the torque from the first front-axle electric machine 160 and the second front-axle electric machine 162 to provide a torque output to a differential portion of the front-axle gearbox 116. The differential portion of the front-axle gearbox 116 may be mechanically coupled to front drive shafts 120 and direct a portion of the torque to a left-side front wheel 170 and a right-side front wheel 172.

A second drive unit 182 may include a first rear-axle electric machine 164 and a second rear-axle electric machine 166 coupled to a rear-axle gearbox 114. The rear-axle gearbox 114 may include one or more gears that combine the torque from the first rear-axle electric machine 164 and the second rear-axle electric machine 166 to provide a torque output to a differential portion of the rear-axle gearbox 114. The differential portion of the rear-axle gearbox 114 may be mechanically coupled to rear drive shafts 122 and direct a portion of the torque to a left-side rear wheel 174 and a right-side rear wheel 176. In some configurations, the electric machines 160, 162, 164, 166 may be integrated into or near the wheel assemblies.

The electric machines 160, 162, 164, 166 may be capable of operating as a motor or a generator. The electric machines 160, 162, 164, 166 can provide propulsion and deceleration capability. The electric machines 160, 162, 164, 166 may act as generators to recover energy that would normally be lost as heat in a friction braking system.

A traction battery or battery pack 124 stores energy that can be used by the electric machines 160, 162, 164, 166. The traction battery 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 may also be electrically coupled to the electric machines 160, 162, 164, 166 and provides the ability to bi-directionally transfer energy between the traction battery 124 and the electric machines 160, 162, 164, 166. For example, a traction battery 124 may provide a DC voltage while the electric machines 160, 162, 164, 166 may operate with a three-phase alternating current (AC) to function. The power electronics module 126 may convert the DC voltage to a three-phase AC waveform to operate the electric machines 160, 162, 164, 166. In a regenerative mode, the power electronics module 126 may convert the three-phase AC waveform from the electric machines 160, 162, 164, 166 acting as generators to a DC voltage level that is compatible with the traction battery 124.

In addition to providing energy for propulsion, the traction battery 124 may provide energy for other vehicle electrical systems. The vehicle 100 may include a DC/DC converter module 128 that converts the high-voltage DC output of the traction battery 124 to a low-voltage DC supply that is compatible with low-voltage vehicle loads. An output of the DC/DC converter module 128 may be electrically coupled to an auxiliary battery 130 (e.g., 12V battery). The low-voltage systems may be electrically coupled to the auxiliary battery. One or more electrical loads 146 may be coupled to the high-voltage bus. The electrical loads 146 may have an associated controller that operates and controls the electrical loads 146 when appropriate. Examples of electrical loads 146 may be a heating module or an air-conditioning module.

The traction battery 124 may be recharged by an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 100. The external power source 136 may provide DC or AC electric power to the EVSE 138. The EVSE 138 may have a charge connector 140 for plugging into a charge port 134 of the vehicle 100. The charge port 134 may be any type of port configured to transfer power from the EVSE 138 to the vehicle 100. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 100. The EVSE connector 140 may have pins that mate with corresponding recesses of the charge port 134. Alternatively, various components described as being electrically coupled or connected may transfer power using a wireless inductive coupling.

One or more wheel brakes 144 may be coupled to the wheels 170, 172, 174, 176 to provide for decelerating the vehicle 100 and preventing motion of the vehicle 100. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system connections may be hydraulic and/or electrical. The brake system 150 may include a controller to monitor and coordinate operation of the wheel brakes 144. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 100 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 100. A vehicle system controller (VSC) 148 may be present to coordinate the operation of the various components.

Although a BEV is depicted, other electric-drive configurations are possible. For example, the vehicle may be a fuel-cell vehicle. The fuel-cell vehicle may include a fuel cell as a primary energy source while the traction battery 124 acts as a secondary energy source. The fuel-cell vehicle may be a plug-in type that permits recharging of the traction battery 124. The vehicle may be a hybrid vehicle that includes an engine and an electric-drive capability. The implementations described herein may be applicable to any vehicles that include an electric-drive having multiple electric machines.

In some configurations, the electric machines 160, 162, 164, 166 may each be configured to provide propulsion torque to drive wheels of the vehicle 100. Various combinations of the electric machines 160, 162, 164, 166 are possible. Configurations may be implemented having from one to four electric machines.

For example, the vehicle 100 may be configured to be a rear-wheel drive (RWD) vehicle in which an electric drive unit is coupled to a rear axle of the vehicle. The RWD vehicle may include only the first rear-axle electric machine 164. In some configurations, the RWD vehicle may include the first rear-axle electric machine 164 and the second rear-axle electric machine 166. In the RWD vehicle, the first front-axle electric machine 160, the second front-axle electric machine 162, and the front-axle gearbox 116 may be absent.

As another example, the vehicle 100 may be configured to be a front-wheel drive (FWD) vehicle in which a drivetrain is coupled to a front axle of the vehicle. The FWD vehicle may include only the first front-axle electric machine 160. In some configurations, the FWD vehicle may include the first front-axle electric machine 160 and the second front-axle electric machine 162. In the FWD vehicle, the first rear-axle electric machine 164, the second rear-axle electric machine 166, and the rear-axle gearbox 118 may be absent.

The vehicle 100 depicted in FIG. 1 may be characterized as an all-wheel drive (AWD) vehicle. In some configurations, the second front-axle electric machine 162 may be absent (e.g, one electric machine on the front axle and two electric machines on the rear axle). In some configurations, the second rear-axle electric machine 166 may be absent (e.g, one electric machine on the rear axle and two electric machines on the front axle). In some configuration, the second front-axle electric machine 162 and the second rear-axle electric machine 166 may be absent (e.g., only one electric machine per axle). The particular configuration may be selected for desired performance and handling characteristics of the vehicle.

Having an electric drive unit on each of the axles of at the electric vehicles allows operation in different operating modes based on conditions. For example, at different times, the vehicle may function as a RWD vehicle, a FWD vehicle, or and AWD vehicle. Such a powertrain allows performance to be optimized. Stability and acceleration may be improved by selecting a particular mode of operation.

Each of the electric machines 160, 162, 164, 166 may be characterized by a torque-speed relationship. The electric machines coupled to an axle may have different torque-speed relationships. For example, the first front-axle electric machine 160 may have a different torque-speed relationship than the second front-axle electric machine 162. For example, the first front-axle electric machine 160 may be configured to deliver a relatively high torque at low speeds with a lower cutoff speed. The first front-axle electric machine 160 may be useful for launch vehicle 100. The second front-axle electric machine 162 may have a lower torque capability but have a higher cutoff speed. Similar characteristics may be present on the electric machines coupled to the rear axle. In addition, the operating characteristics of the electric machines may differ between axles (e.g., the first front-axle electric machine 160 may have different characteristics than the first rear-axle electric machine 164).

The front-axle gearbox 116 and the rear-axle gearbox 118 may have different gear ratios. The gear ratios of one gearbox may be configured to output high torque at low speeds. The other gearbox may be configured with a gear ratio optimized for highway cruising speeds. As such, the front-axle gearbox 116 and the rear-axle gearbox 116 may have different operating characteristics.

During operation, the drive units 180, 182 may experience power losses due to friction and operating characteristics of the components that make up the drive unit. The drive units 180, 182 may be characterized by a power loss function. The power loss function may be configured to estimate the amount of power lost in the drive unit 180, 182 during vehicle operation. The power loss function may be a function of the electric machine efficiency, the power electronics module efficiency, and friction within the electric machines and associated gearboxes and the related gear train. The power loss function estimates an amount of power lost at the output of the drive unit 180, 182 from the power that is input to the drive unit 180, 182. Each of the drive units 180, 182 may have a different power loss function. Each of the drive units 180, 182 may be optimized for a different operating range. For example, one may be optimized to reduce losses under steady-state high-speed conditions. The other drive unit may be optimized to reduce losses under low-speed conditions. As such, an operating strategy may be implemented to determine which of the drive units 180, 182 should be operating under the present and anticipated operating conditions. Additionally, when a drive unit includes multiple electric machines, an operating strategy may be implemented to determine how much power should be provided by each of the electric machines within the drive unit.

The power loss function may be depicted as a loss map or map. The drive unit losses may vary as a function of the torque and speed of the drive unit. The drive unit losses may vary as a function of the DC input voltage. The power loss function may be a complex multi-variable function.

The operating strategy of the electric vehicle 100 may be configured to minimize drive unit power losses over the range of operating conditions. Typical optimization functions may be iterative functions that may require time to converge to a solution. Such optimization routines may be difficult to perform in a real-time environment. As such, it may be useful to reduce the optimization routine to a mathematical expression.

The drive unit power loss map may be approximated with one or more mathematical expressions. A second-order polynomial of the form $ax^2+bx+c$ may be selected. The coefficients (a, b, c) may be derived from the drive unit power loss map. The approximation may include a plurality of sets of coefficients for different operating conditions. For example, a set of coefficients may correspond to a particular drive unit speed and/or a particular voltage input. For example, for an AWD vehicle having a front axle motor and a rear axle motor, the power loss approximations may be expressed as:

$$P_{loss,fr} = a_{2,fr}T_{fr}^2 + a_{1,fr}T_{fr} + a_{0,fr} \quad (1)$$

$$P_{loss,rr} = a_{2,rr}T_{rr}^2 + a_{1,rr}T_{rr} + a_{0,rr} \quad (2)$$

where the subscript fr indicates the front-axle drive unit 180, the subscript rr indicates the rear-axle drive unit 182.

The second-order polynomial with coefficients ($a_2$, $a_1$, $a_0$) may represent the way that power loss changes as torque varies. The coefficient, $a_2$, represents the degree of curvature of the second-order polynomial. As the coefficient, $a_2$, increases, the curve may appear more closed with steeper sides. The coefficient, $a_2$, may also be indicative of the rate of change of the slope of the curve (e.g., second derivative of the power loss function). The coefficients, $a_1$ and $a_2$, may define the x-coordinate of the axis of symmetry of the second-order function. The coefficient, $a_0$, may define the height along the y-axis of the second-order polynomial.

When the power losses are represented as above, various observations may be made. The power loss changes relative to torque changes according to the power loss approximations. A first derivative of the power loss approximation results in a linear equation for the power loss change relative to torque changes. The first derivative of the power loss map represents the slope of the power loss curve at each torque value. The second derivative of the power loss approximation results in a rate of power loss change that is proportional to the second-order coefficient. The second derivative represents the rate of change of the slope of the power loss curve at each torque value.

A total electric drive power loss may be expressed as:

$$P_{loss,total} = \Sigma P_{loss,fr} + \Sigma P_{loss,rr} \quad (3)$$

The summation provides for multiple electric machines on each of the axles. That is, the power loss for each electric-drive unit coupled to the axle is summed together. For the discussion to follow, one electric machine per axle is assumed. In general, the total electric drive power loss may be expressed as the sum of the power loss associated with each of the electric machines.

To provide propulsion torque, a driver demand torque, $T_o$, may be known or calculated. For example, the system controller may periodically receive input from an accelerator pedal to determine the driver demand torque. In addition, the system controller may periodically receive input from a brake pedal to determine the driver demand torque.

The driver demand torque may be equal to the sum of all of the torques provided by the drive units as follows:

$$T_o = T_{fr} + T_{rr} \quad (4)$$

The optimization goal is to find the torque distribution between the electric motors that satisfies the driver demand torque and minimizes the drive unit power losses. The optimization rule for minimum power loss may be determined as:

$$\frac{\partial}{\partial T_{fr}} P_{loss,total}(T_{fr}) = 0 \quad (5)$$

The expression may be solved by replacing $T_{rr}$ with the equivalent expression, $T_o - T_{fr}$ in the $P_{total,loss}$ expression. This leaves a power loss expression in terms of $T_{fr}$ only. The expression may be differentiated and equated to zero to yield:

$$T_{fr} = \frac{2a_{2,rr}T_o + a_{1,rr} - a_{1,fr}}{2(a_{2,fr} + a_{2,rr})} \quad (6)$$

$$T_{rr} = T_o - T_{fr} \quad (7)$$

The above expressions may be computed in real-time knowing the driver demand torque and the drive unit power loss coefficients.

At a given operation condition, the power loss of each electric-drive unit may be represented by a second-order polynomial with respect to a range of drive unit torques. Initially, each may be expressed independently as a function of torque for each drive unit. When combining the power losses and optimizing, the rear drive unit power loss functions may be shifted to be expressed in terms of the torque values of the front drive unit. The amount of the shift may depend upon the driver demand torque. The shifted rear drive unit power loss curve may then be added to the unshifted front drive unit power loss curve to obtain the combined power loss curve—which results in another second order polynomial function. Graphically, the minimum is the vertex of the parabola.

Based on equation (6), it is observed that the front-axle torque includes a proportion of the driver demand torque.

The proportion of the driver demand torque is specified by a ratio of the second-order coefficient of the rear-axle drive unit to the sum of the second-order coefficients of the front-axle and rear-axle drive units. The proportion of torque to the front-axle drive unit 180 increases as the degree of curvature (represented by $a_2$ coefficients) of the rear-axle drive unit power loss increases relative to the degree of curvature of the front-axle drive unit. This may be generalized to other cases in which the electric machines are driving the same axle. The proportion of driver demand torque requested by a first electric machine may increase in response to an increase in the degree of curvature of a second electric machine power loss relative to the degree of curvature of the first electric machine power loss. Each of the drive units may exhibit a power loss change with respect to torque (e.g., slope of power loss curve). The proportion of drive demand torque requested by the first drive unit may increase in response to an increase in the rate of power loss change of the second drive unit relative to the first drive unit.

The torque equation for the front-axle drive unit also includes a difference between the first-order coefficient of the rear-axle drive unit and the first-order coefficient for the front-axle drive unit. The amount of torque requested by the front-axle drive unit increases as the first-order coefficient ($a_1$) of the rear-axle drive unit increasing relative to the first-order coefficient of the front-axle drive unit. Again, this may be generalized to other electric machine configurations. Since the rear-axle torque is derived from the front-axle torque, an increase in amount torque requested by the front-axle drive unit leads to a decrease in the amount of torque requested by the rear-axle drive unit (e.g., proportion of total torque provided by front-axle drive unit increases).

Figure 2:
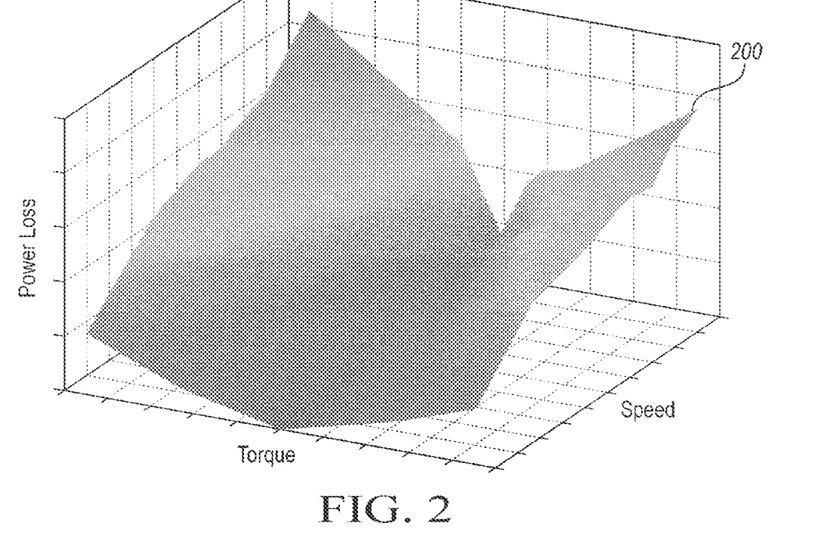
FIG. 2 is a map of a drive unit power loss as a function of speed and torque.
Figure 4:
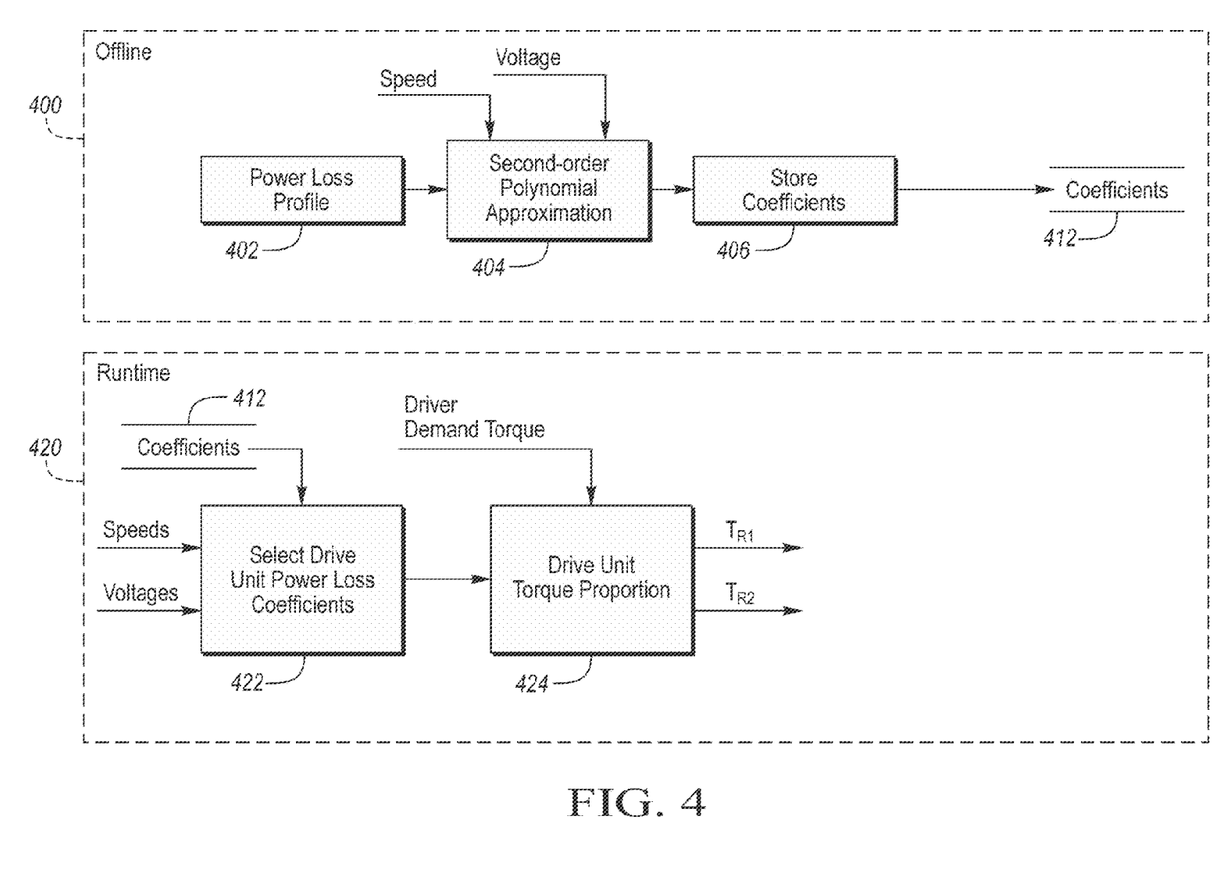
FIG. 4 is a block diagram for a system for apportioning torque between electric drive units.

FIG. 4 depicts a block diagram representing the control system. Implementation of the system may include an offline preprocessing stage 400. Block 402 represents determining a power loss map for each of the drive units 180, 182. Each of the electric machines 160, 162, 164, 166 that are included in the system may be characterized in terms of power loss. Each of the drive units 180, 182 may be characterized in terms of power loss. FIG. 2 depicts a surface 200 for a typical power loss map. The power loss map for the drive units may be obtained from testing data by varying torque and speed over a range of values. The power loss map may be determined by measuring the power input (e.g., product of voltage at current input) and the power output (e.g., product of speed and torque). The power loss surface 200 may be indexed by drive unit torque and drive unit speed. That is, knowing a drive unit torque value and a drive unit speed value, the power loss may be determined.

Figure 3:
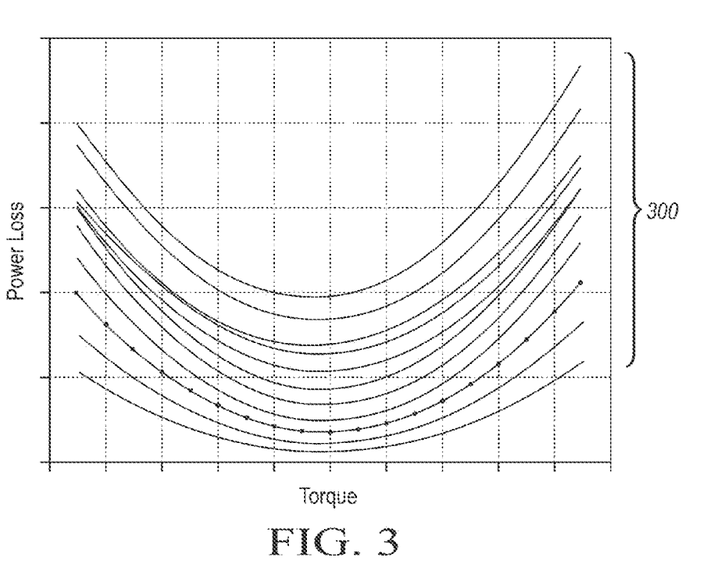
FIG. 3 is a graph depicting a set of second-order polynomial approximations for a drive unit power loss.

Referring again to FIG. 4, block 404 represents the approximation of the power loss map with second-order polynomials. The power loss surface 200 may be depicted in two dimensions as shown in FIG. 3. FIG. 3 depicts a series of parabolic lines 300 that depict power loss as a function of drive unit torque. Each of the lines 300 may represent the power loss function for a given speed and/or input voltage. For each of the lines 300, a second order approximation, as expressed by equations (1) and (2), may be computed. Each of the lines may be characterized by the second-order parameters. The second-order parameters may be derived from various techniques such as least squares methods or other polynomial curve fitting methods. Each of the electric-drive units may be associated with a plurality of coefficient sets or groups that represent drive unit losses at a plurality of operating conditions.

Referring again to FIG. 4, at block 406, the coefficients for each of the second-order polynomials may be computed and stored in non-volatile memory of the controller represented by a coefficient data store 412. For each of the drive units, a set of second-order parameters for each of the selected operating speeds and voltages may be stored in controller non-volatile memory. A table or database of second-order parameters may be stored and indexed by drive unit speed and/or input voltage. The drive unit speed may be proportional to the vehicle speed while the vehicle is operating. The coefficients may be stored in non-volatile memory of the controller (e.g., system controller 148).

The system may include real-time or runtime processing 420. During runtime, the speed of the electric machines may be measured directly and/or indirectly. A shaft speed sensor may be installed on each of the electric machines to measure the speed of rotation of the electric machine shaft. The shaft speed sensor may be a resolver or an encoder. Wheel speed sensors may be included near the wheels to measure the rotational speed of the wheels. In general, the electric machine shaft speeds may differ from the wheel speeds according to known gear ratios and tire diameters. The drive unit speed may be the electric machine speed or may differ from the electric machine speed by a gear ratio. The present speed of the drive unit and the input voltage may be determined. Block 422 may include instructions to select the appropriate second-order parameters from the coefficient data store 412 based on the drive unit speeds and input voltages. As operating conditions of the vehicle change, different second-order polynomial coefficients may be selected. Changes in the operating conditions may include changes in the input voltage and changes in drive unit speeds. The coefficients may be retrieved from a lookup table. Block 424 may include instructions to compute the proportion of torque to be provided by each of the drive units (e.g., according to equations (6) and (7)) based on the selected coefficients and the driver demand torque. Outputs of block 424 may include a torque request for each of the drive units. The torque requests may be provide to power electronics module 126 to cause the electric machines to provide the requested torque amount.

The torque requested by each of the drive units may be subject to torque and power limitations of the electric machines. For example, a drive unit may not be requested to provide more torque than it is capable of providing. Further, battery power limits may limit the amount of torque and power that the drive units can provide.

A benefit of the described system is that torque may be apportioned between the electric machines and drive units to minimize power losses. In addition, the system enables fast runtime optimization of the torque distribution without performing time-consuming iterative optimization algorithms. Further, the system described may be used on any configuration utilizing multiple electric machines and is not necessarily limited to the AWD example presented.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric-drive vehicle comprising:
   first and second propulsive drive units coupled to front and rear axles of the vehicle respectively, each drive unit exhibiting power loss change with respect to torque changes over a plurality of operating conditions; and
   a controller programmed to increase a proportion of propulsive torque provided by the first drive unit in response to a change in the operating conditions resulting in a rate of power loss change of the second drive unit increasing relative to that of the first drive unit.

2. The electric-drive vehicle of claim 1 wherein the controller is further programmed to decrease a proportion of propulsive torque provided by the first drive unit in response to the change in operating conditions resulting in the rate of power loss change of the second drive unit decreasing relative to that of the first drive unit.

3. The electric-drive vehicle of claim 1 wherein the controller is further programmed to derive the rate of power loss change from a second-order coefficient of a second-order polynomial that characterizes power loss at a present operating condition.

4. The electric-drive vehicle of claim 1 wherein the operating conditions include a voltage input to the first and second drive units and a speed associated with the first and second drive units.

5. The electric-drive vehicle of claim 1 wherein the controller is further programmed to derive the rate of power loss change from a power loss map that is characterized by a plurality of second-order polynomials each describing drive unit power loss at a predetermined drive unit speed and a predetermined drive unit input voltage.

6. The electric-drive vehicle of claim 5 wherein each of the second-order polynomials describes drive unit power loss for a range of drive unit torque values.

7. The electric-drive vehicle of claim 5 wherein the controller is further programmed to change the proportion of propulsive torque provided by the first drive unit in response to a change in operating conditions resulting in a first-order power loss coefficient of the second drive unit changing relative to a first-order power loss coefficient of the first drive unit.

8. A method for apportioning torque between drive units in an electric-drive vehicle comprising:
   in response to a change in operating conditions, increasing, by a controller, a proportion of propulsive torque provided by a first drive unit, based on relative power loss characteristics of the first drive unit and a second drive unit, such that a rate of power loss change of the second drive unit increases relative to that of the first drive unit.

9. The method of claim 8 further comprising decreasing, by the controller, a proportion of driver demand torque provided by the first drive unit in response to a change in operating conditions resulting in a rate of power loss change of the second drive unit decreasing relative to that of the first drive unit.

10. The method of claim 8 further comprising deriving, by the controller, the rate of power loss change from second-order coefficients of second-order polynomials that characterize power loss maps at a present operating condition for each of the drive units.

11. The method of claim 10 further comprising changing, by the controller, the proportion of propulsive torque provided by the first drive unit according to a ratio of the second-order coefficient of the second drive unit to a sum of second-order coefficients of the first drive unit and the second drive unit.

12. The method of claim 10 further comprising increasing, by the controller, an amount of torque provided by a first drive unit in response to an increase in a first-order coefficient of the second drive unit relative to the first drive unit.

13. The method of claim 12 further comprising increasing, by the controller, the amount of torque provided by the first drive unit according to a ratio of a difference between the first-order coefficients of the first and second drive units to a sum of the second-order coefficients of the first and second drive units.

14. The method of claim 8 wherein the change in operating conditions includes an input voltage change and a drive unit speed change.

15. An electric-drive vehicle propulsion system comprising:
   a controller programmed to increase a proportion of torque provided by a first electric machine relative to a second electric machine based on power loss of the electric machines with respect to torque, in response to operating condition changes that result in an increase in a rate of power loss change of the second electric machine relative to that of the first electric machine.

16. The electric-drive vehicle propulsion system of claim 15 wherein the controller is further programmed to derive the rate of power loss change from a second-order coefficient of a second-order polynomial that characterizes a power loss map at a present operating condition.

17. The electric-drive vehicle propulsion system of claim 15 wherein the controller is further programmed to decrease a proportion of torque provided by the first electric machine in response to a decrease in the rate of power loss change of the second electric machine relative to the first electric machine.

18. The electric-drive vehicle propulsion system of claim 15 wherein the first electric machine and the second electric machine are coupled to a front axle of the electric-drive vehicle.

* * * * *